(12) United States Patent
Stenbratt et al.

(10) Patent No.: US 12,051,284 B2
(45) Date of Patent: Jul. 30, 2024

(54) VEHICLE CONTROL ARCHITECTURE BASED ON CENTRAL COORDINATION OF LOCALLY APPLIED AND UPDATABLE MOTION SUPPORT DEVICE ABSTRACTIONS

(71) Applicant: VOLVO TRUCK CORPORATION, Gothenburg (SE)

(72) Inventors: Ulf Stenbratt, Vallda (SE); Leo Laine, Härryda (SE); Peter Hansson, Grästorp (SE); Lance Higgins, Askim (SE); Anders Magnusson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 406 days.

(21) Appl. No.: 17/459,484

(22) Filed: Aug. 27, 2021

(65) Prior Publication Data

US 2022/0068047 A1 Mar. 3, 2022

(30) Foreign Application Priority Data

Sep. 1, 2020 (EP) ..................................... 20193869

(51) Int. Cl.
*G07C 5/00* (2006.01)
*B60T 17/22* (2006.01)

(52) U.S. Cl.
CPC ............ *G07C 5/008* (2013.01); *B60T 17/221* (2013.01); *B60T 2210/30* (2013.01); *B60T 2240/03* (2013.01)

(58) Field of Classification Search
CPC ... G07C 5/008; B60T 17/221; B60T 2210/30; B60T 2240/03; H04L 2012/40273;

(Continued)

(56) References Cited

U.S. PATENT DOCUMENTS

2005/0251604 A1* 11/2005 Gerig .................... H04L 69/326
710/120
2018/0099712 A1* 4/2018 Bean .................... G08B 13/126
(Continued)

FOREIGN PATENT DOCUMENTS

CN 103481798 A 1/2014
CN 103481843 A 1/2014

OTHER PUBLICATIONS

European Search Report dated Feb. 9, 2021 in corresponding European Patent Application No. 20193869.3, 9 pages.

*Primary Examiner* — Sizo B Vilakazi
(74) *Attorney, Agent, or Firm* — Venable LLP; Jeffri A. Kaminski

(57) ABSTRACT

A wheel end computer, WEC, (220) for hosting and executing one or more motion support device abstraction modules (MSDA, 221) configured to monitor and/or to control operations of one or more respective motion support devices, MSDs, (240, 250, 260, 270) on a heavy duty vehicle, where an MSDA provides a control and/or a monitoring interface between an external vehicle unit computer (VUC, 210), and a respective MSDs operational functionality, wherein the WEC (220) is arranged to identify a matching MSDA for each MSD in a set of MSDs, such that each MSD connected to the WEC is matched to a respective MSDA, and wherein the WEC (220) is arranged to receive a monitor and/or a control command from the VUC (210) for monitoring and/or controlling an MSD connected to the WEC, and to control the MSD via the respective matching MSDA.

17 Claims, 6 Drawing Sheets

(58) Field of Classification Search
CPC .......... H04L 12/40169; G05B 19/0423; G05B 2219/25257
See application file for complete search history.

(56) References Cited

U.S. PATENT DOCUMENTS

| | | | |
|---|---|---|---|
| 2019/0296937 A1* | 9/2019 | Kern | H04L 12/403 |
| 2020/0125086 A1* | 4/2020 | Switkes | B60T 7/22 |
| 2020/0139805 A1* | 5/2020 | Biderman | A63B 21/0058 |

* cited by examiner

US 12,051,284 B2

VEHICLE CONTROL ARCHITECTURE BASED ON CENTRAL COORDINATION OF LOCALLY APPLIED AND UPDATABLE MOTION SUPPORT DEVICE ABSTRACTIONS

TECHNICAL FIELD

The present disclosure relates to a computer placed close to a wheel, a wheel end computer (WEC). The computer is arranged to execute motion support device abstractions in software which monitor and control mechanical devices that contribute to the vehicle's motion, such as clutches, combustion engines, electric motors, friction brakes, shock absorbers and power steering devices, via respective interfaces.

The invention can be applied in heavy-duty vehicles such as trucks, busses and construction machines. Although the invention will be described mainly with respect to cargo transport vehicles such as semi-trailer vehicles and trucks, the invention is not restricted to this particular type of vehicle but may also be used in other types of vehicles such as cars.

BACKGROUND

Vehicles are becoming ever more complex in terms of mechanics, pneumatics, hydraulics, electronics, and software. A modern heavy duty vehicle, such as a semi-trailer truck, may comprise a wide range of different physical devices, such as combustion engines, electric machines, friction brakes, regenerative brakes, shock absorbers, air bellows, and power steering pumps. These physical devices are commonly known as Motion Support Devices (MSD). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine.

Recently proposed vehicle motion management (VMM) functionality executed on a central vehicle unit computer (VUC) relies on combinations of the MSDs to operate the vehicle in order to obtain a desired motion effect while at the same time maintaining vehicle stability, cost efficiency and safety. WO2019072379 A1 discloses one such example where wheel brakes are used selectively to assist a turning operation by a heavy duty vehicle.

Different suppliers of MSDs normally provide proprietary software for monitoring and controlling MSD functionality and some suppliers also offer proprietary wheel end computers for controlling the supplier MSDs. However, as the MSD ecosystem on the market grows, the need for co-existence of MSDs from different suppliers on a single vehicle increases. Thus, there is a need for a vehicle control architecture which facilitates coordination, monitoring and controlling different types of MSDs on a vehicle.

Also, as the availability of different types of MSDs on the market grows, there is a need to verify that MSDs currently mounted on a given vehicle have specifications which meet requirements of the vehicle in order to guarantee vehicle function.

SUMMARY

It is an object of the present disclosure to provide a wheel end computer (WEC) which is easily reconfigurable to monitor and to control a variety of different types of motion support devices (MSDs), including sensors integrally formed with the MSDs and/or separate from the MSDs. This object is at least in part obtained by a WEC configured to host and to execute one or more motion support device abstractions (MSDAs) for monitoring and/or controlling operations of one or more respective MSDs on a heavy duty vehicle. An MSDA provides a control and/or a monitoring interface between an external vehicle unit computer (VUC) and a respective MSDs operational functionality. The WEC is arranged to identify a matching MSDA for each MSD in a set of MSDs connected to the WEC, such that each MSD connected to the WEC is matched to a respective MSDA. The WEC is also arranged to receive a monitoring and/or a control command from the VUC for monitoring and/or controlling an MSD connected to the WEC, respectively, and to control the MSD via the respective matching MSDA.

This way, a vehicle control architecture is provided which facilitates coordination, monitoring and controlling different types of MSDs on a vehicle. Since MSDAs can be replaced, software updates to account for changes in MSDs connected to the WEC can easily be accommodated. Overall, this allows for a much more flexible design architecture where vehicle control functionality is no longer so dependent of the particular types of MSDs mounted on the vehicle, since modifications in the MSD flora on a vehicle can be easily adjusted for by corresponding modifications to the MSDAs executed on the WEC.

According to aspects, the WEC is arranged to obtain and to store a plurality of replaceable MSDAs. This plurality of replaceable MSDAs further simplify modifications to the MSDs of a vehicle. When a new MSD is connected to the vehicle, and thus also to the WEC, the WEC may search through its MSDAs for a matching MSDA. If a matching MSDA is found, this MSDA can be used to control the newly installed MSD. The WEC may comprise an output port for controlling one or more connected devices comprising any of; a wheel brake, an active suspension device, a propulsion device, and/or a power steering device based on the plurality of replaceable MSDA.

According to aspects, the WEC comprises an input port for receiving data from one or more connected devices comprising any of; a wheel brake, an active suspension device, a propulsion device, and/or a power steering device. This way, data from a connected device can be interpreted by the matching MSDA in the plurality of replaceable MSDA. Thus, the overall vehicle control architecture does not need to be redesigned if a new type of MSD is included in the design, or if an MSD from one supplier is replaced by an MSD from another supplier, since the MSDA (which is conveniently replaceable) is used to interpret the data and thus translate the data into a format which the higher layer control algorithms can use.

According to aspects, the WEC is arranged to store one or more default MSDAs, and to associate a default MSDAs with an MSD in case no matching MSDA can be identified in the plurality of replaceable MSDA. Thus, similar to what happens if an unknown peripheral device such as a new keyboard or a computer mouse is connected to a personal computer, the default MSDA can be used to get at least some of the functionality out of the MSD, even if no matching MSDA can be found. For instance, a service brake can potentially be used with limited braking functionality but no advanced slip control function until a matching driver can be found which allows use of the full functional capability of the MSD.

According to aspects, the WEC is configured to receive one or more updated MSDAs, and to replace corresponding stored MSDAs by the received updated MSDAs. This mechanism allows for an efficient centralized update procedure which can be used to ensure that the control architecture for controlling MSDs in a fleet of vehicles is always up to date. Patches for fixing software errors, and performance optimizing updates can be distributed to a fleet of vehicles in a convenient and efficient manner. For instance, the WEC may be configured to connect to an external MSDA-repository, to identify one or more updated MSDAs, download the identified updated MSDAs, and to replace corresponding stored MSDAs by the downloaded updated MSDAs.

According to aspects, the WEC is furthermore arranged to execute an authentication protocol for verifying that the set of MSDAs currently active in the WEC are authorized for use with the WEC. This way it can be assured that the MSDAs meet requirements imposed on the control architecture. Third party software can be certified for use with a given type of vehicle, and only certified third party software can be allowed to run on the WEC. A similar mechanism can be used for verifying that MSDs connected to the vehicle meet requirements imposed on the vehicle. Thus, according to some aspects, the WEC is also arranged to execute an authentication protocol for verifying that an MSD currently connected to the WEC is authorized for use with the WEC, wherein the MSD currently connected to the WEC comprises a control unit configured to communicate with the WEC via the respective matching MSDA.

According to aspects, the WEC is arranged to obtain and to store one or more data processing algorithms associated with respective wheel end and/or axle sensors. The WEC is then arranged to obtain sensor data from a wheel end and/or axle sensor, and to execute a data processing algorithm associated with the wheel end and/or axle sensor to process the sensor data. This means that data processing algorithms can be adapted to the current set of MSDs mounted onto the vehicle. MSD suppliers and others can now provide customized data processing algorithms tailored for specific MSDs, which is an advantage. Such data processing algorithms may for instance comprise algorithms for estimating any of; wheel rotation angle, wheel speed, wheel force and/or wheel torque, tyre wear, brake pad wear, and capability changes due to temperatures based on sensor data. The data processing algorithms may also be configurable in dependence of a tyre associated with the wheel end module. This means that tyre manufacturers can now provide software modules which are specifically tailored for a given tyre. Thus, algorithms which depend on properties of the tyre can be optimized for the specific tyre mounted on the vehicle, which is an advantage.

There is also disclosed herein methods, control systems, control units, computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
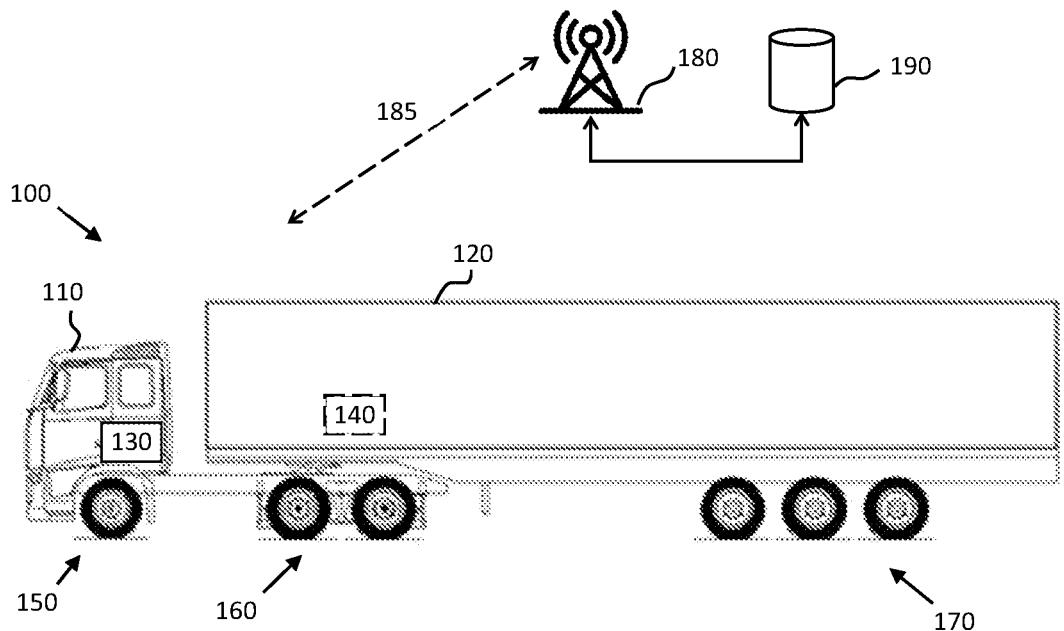
FIG. 1 shows an example heavy duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a tractor or towing vehicle 110 supported on front wheels 150 and rear wheels 160, at least some of which are driven wheels. The tractor 110 is configured to tow a first trailer unit 120 supported on trailer wheels 170 by a fifth wheel connection in a known manner. The trailer wheels are normally braked wheels but may also comprise driven wheels on one or more axles.

The tractor 110 comprises a VUC 130 for controlling various kind of functionality, i.a. to achieve propulsion, braking, and steering. Some trailer units 120 also comprise a control unit 140 for controlling various functions of the trailer.

The vehicle 100 optionally comprises a wireless communications transceiver arranged to establish a radio link 185 to a wireless network 180. This way the control units 130, 140 may access remote servers 190 connected to the wireless network 180 for uploading and downloading data.

Figure 3:
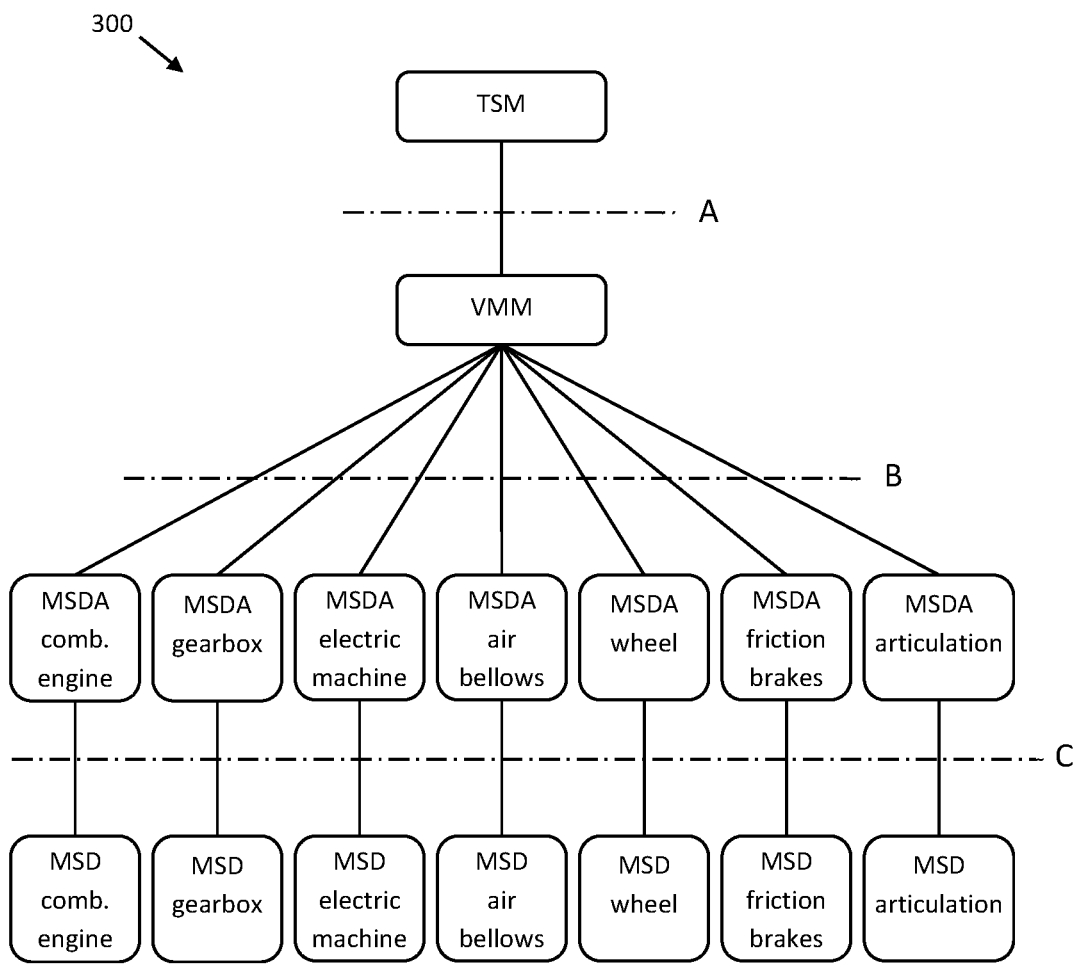
FIG. 3 shows a control and monitoring hierarchy for a heavy duty vehicle.

With reference also to FIG. 3, the control unit 130 on the tractor 110 (and possibly also the control unit 140 on the trailer 120) may be arranged according to a layered functional architecture where some functionality may be comprised in a traffic situation management (TSM) domain in a higher layer and some other functionality may be comprised in a vehicle motion management (VMM) domain residing in a lower layer. The TSM plans driving operation with a time horizon of, e.g., 10 seconds and monitor and control VMM. This time frame corresponds to, e.g., the time it takes for the vehicle 100 to negotiate a curve. The vehicle maneuvers planned and executed by the TSM can be associated with acceleration profiles and curvature profiles. The TSM continuously requests the desired acceleration profiles and curvature profiles from the VMM which performs force allocation to meet the requests from the TSM in a safe and robust manner.

The VMM operates with a time horizon of about 1 second or so, and continuously transforms the acceleration profiles and curvature profiles into control commands for controlling vehicle motion functions, actuated by the different MSDs of the vehicle. The VMM also manages the functionality to decide if the vehicle is turned off, parked, or in motion, reversing or forwarding. If the vehicle is in motion, the VMM performs motion estimation, i.e., determines positions, speeds, accelerations, articulation angles of the different units in the vehicle combination by monitoring operations using various sensors arranged on the vehicle, often in connection to the MSDs.

The VMM furthermore manages force generation and coordination, i.e., it determines what forces that are required in order to fulfil the requests from the TSM, for instance to accelerate the vehicle according to a requested acceleration profile requested by TSM and/or to generate a certain curvature motion by the vehicle also requested by TSM. The forces may comprise e.g., longitudinal forces and lateral forces, as well as different types of torques.

Each MSD is associated with a respective MSD abstraction (MSDA) which is hosted and executed by a WEC. An MSDA provides a control and/or a monitoring interface between an external vehicle unit computer (VUC) and a respective MSDs operational functionality. An MSDA is, according to some aspects of the present disclosure, similar to a software driver normally found in computer operating systems which is arranged for driving electrical circuits. An MSDA can be seen as a software module arranged for driving a mechanical device which potentially also comprises one or more sensors. Thus, according to some aspects, an MSDA may also be referred to as an MSD driver.

With reference again to FIG. 3, the VMM performs coordination of the various MSDs via the MSDAs in the vehicle combination in order to obtain the desired vehicle actions. This may entail, i.a., coordinating propulsion devices, friction brakes, auxiliary brakes, suspension devices, and steering devices. Examples of the translation between TSM requests (such as acceleration profiles and curvatures) and MSD actions by a VMM layer are known in general and will therefore not be discussed in more detail herein.

An MSDA generally provides an interface that makes it possible to monitor and control its operation, where the use of its control interface, e.g., by the VMM, results in that the MSDA operates the actual MSD actions. This interface can be provided via classical signal oriented interaction patterns but also client/server and publisher/subscriber mechanisms.

There may be different types of MSDs having similar functions mounted in a vehicle combination at the same time, such as a hydraulic drum brake on one part of the vehicle and a disc brake on another part of the vehicle; an electric drum brake for braking some wheel on the vehicle and a disc brake for braking another wheel; a direct current electric motor on one part of the vehicle and an alternating current electric motor on some other part of the vehicle. Thus, different MSDAs may present different kinds of interfaces towards higher layer functions such as the VMM.

Other vehicle parts such as fifth wheel connections, drawbars, etc., may also be seen as MSDs, and can therefore be associated with respective MSDAs. A fifth wheel connection may, for instance, be associated with an MSDA running on a WEC from which an articulation angle value can be obtained. Similarly, a towing hook unit may be associated with an MSDA that provides data regarding if a trailer is currently connected to the towing hook or not.

As more and more MSDs with accompanying MSDAs become available on the market, it would be advantageous if the same electronic control unit (ECU), or more specifically a WEC, could be used to operate more than one type of MSD by hosting multiple MSDAs from different suppliers.

FIG. 3 presents an overview of an example control architecture 300 for use in controlling a vehicle 100 such as the vehicle discussed above in connection to FIG. 1. The TSM and the VMM were discussed above. The TSM communicates with the VMM via an interface A. This interface is normally a wired interface, such as an Ethernet interface, but other types of interfaces are also possible, including wireless links.

The VMM is connected to a plurality of MSDAs according to the discussion above. This connection is via interface B. It is appreciated that this interface is normally a wireline digital interface, but wireless interfaces are also possible.

Each MSDA then controls a respective MSD over an interface C. This interface C is normally dependent on the type of MSD which is controlled. It may comprise both analog and digital signals, and even mechanical, hydraulic and pneumatic signals are possible. An MSD may comprise various sensors that can be accessed via the interface C.

The various MSDs and sensors may be of different type and may come from different suppliers. Thus, the WEC 220 may need to adapt control commands in dependence of the type and brand of sensor or MSD to obtain the desired effect.

By implementing the proposed architecture based on MSDAs, it becomes possible to use a standardized interface B between the VMM and the different MSDAs running on one or more WECs, which WECs then handle interfacing C towards the different MSDs, as well as reporting back status and capabilities to the VMM function, normally in a standardized format.

Various wheel end sensors can be arranged in connection to a wheel, and/or in connection to an MSD. For instance, a wheel speed sensor provides an output signal which indicates a rotational velocity of the wheel. A force sensor may be arranged in connection to a suspension unit to provide information related to current normal load of the wheel. These output signals may be formatted differently from sensor to sensor, and an algorithm for estimation of, e.g., wheel slip may differ in dependence of which sensor that provides the wheel speed data. An MSDA may be used to absorb such differences in order to present a more unified interface towards higher layer functions.

Figure 2:
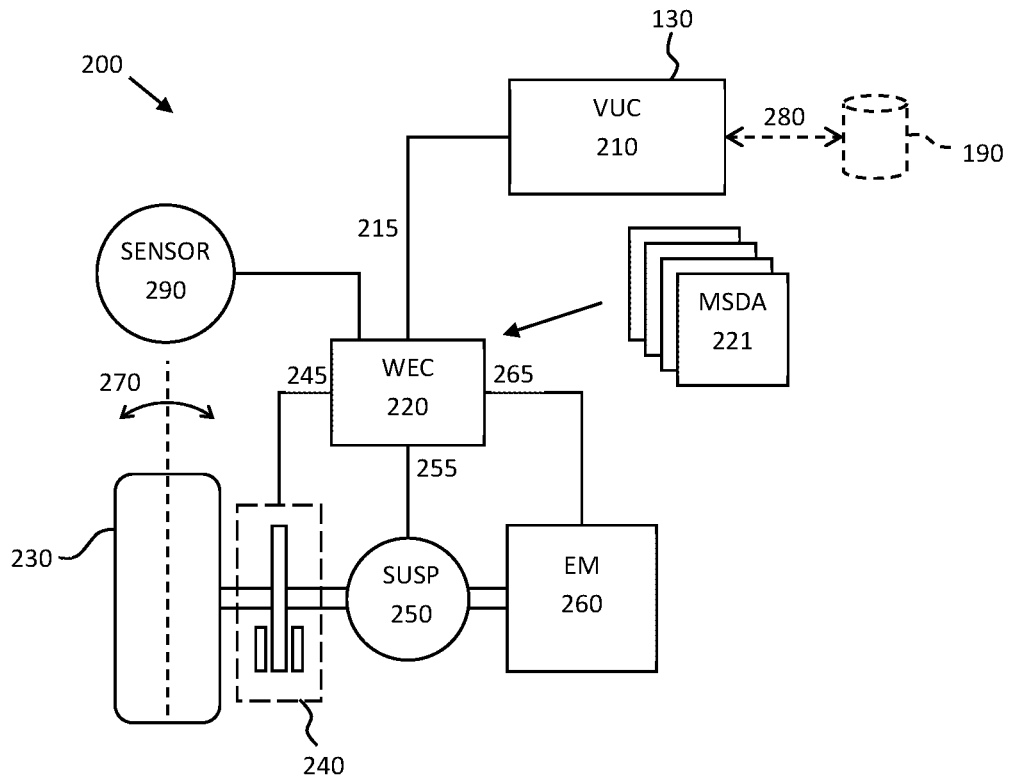
FIG. 2 schematically illustrates a wheel end control and monitoring arrangement.

FIG. 2 illustrates an arrangement 200 with a WEC 220. The software running on VUC generates control commands towards MSDAs hosted and executed on the WEC 220, and receives status and capability reports from the MSDAs running on the WEC 220. This information exchange may in some implementations take place over a standardized interface 215. The VUC 210 may form part of the vehicle control unit 130 discussed above and may implement functionality such as the VMM and possibly also the TSM discussed in connection to FIG. 3. The VUC 210 may furthermore comprise one or more communications modules, wireless or wired, enabling it to form a communications link 280 to, e.g., the remote server 190 discussed above.

The WEC 220 comprises ports for interfacing to various MSDs, potentially of different types. A 'port' in this context may be an analogue or a digital electric connection to a physical actuator or sensor. A port may also comprise a collection of analogue and/or digital connections to a physical actuator or sensor device.

FIG. 2 shows ports or interfaces 245, 255, 265 to a wheel brake 240, an active suspension device 250, and an electric machine 260, respectively, and also a power steering device 270. The electric machine 260 may be arranged to generate both positive and negative torque.

Each wheel 230, or at least a subset of wheels on the vehicle 100, may be associated with a WEC 220 which controls MSDs 240, 250, 260, 270 related to that particular wheel. By moving functionality closer to the wheel end, control loops are made shorter, since many functions, such as wheel slip control, can be performed locally with a low latency control loop and thus high control bandwidth. It is appreciated that a WEC may control functions associated with an axle of a vehicle. In this case the WEC is perhaps more appropriately referred to as an axle computer, although WEC will generally be used herein.

The WEC 220 is configured to host software from different suppliers, it could be that standard wheel end sensors from the vehicle manufacturer are used together with algorithms from a tyre supplier which predicts properties of the tyre such as state of health in wear, wear factor, predicted time for changing tyres. Thus, an MSDA may interface with other software modules for increased functionality. Such other software modules may be in the form of software module plug-ins for providing increased and/or refined functionality by the MSDA. For example, suppose that the WEC comprises an MSDA for monitoring a wheel. The wheel has a tyre from a given tyre supplier. This tyre supplier may supply a software plug-in module which, when plugged into the MSDA for the wheel, allows for estimating current properties of the tyre and also predicting future properties of the tyre such as state of health in wear, wear factor, and a predicted time for changing tyres. If the tyre is replaced by a tyre from a different manufacturer, the plug-in module can be changed to a plug-in module more suited for the new tyre, perhaps developed by the supplier of the new tyre.

Various wheel end sensors 290, such as wheel rotation angle sensors, wheel speed sensors, wheel force sensors and/or wheel torque sensors, wheel hub temperature sensors, brake disc temperature sensors, air pressure sensors, wheel accelerometer sensors and tyre sensors such as air pressure may as noted above be arranged in connection to the wheel 230. The WEC 220 is optionally configured to receive measurement data and status reports from these sensors and to process the measurement data in order to estimate various metrics and parameters, which are then made available or reported actively to the VUC 210 via the interface 215, or used directly in the WEC for wheel end module control. Measurement data, in this context, may comprise, e.g., just an analogue value or a digital value which has been pre-processed by a computer on the MSD. In case the MSDs all comprise advanced computers, the WEC reverts back to a function similar to that of a hub or switch which forwards information between MSDs and VUC.

To summarize, it is proposed herein to implement a novel type of WEC 220 for hosting and executing one or more replaceable MSDAs configured to monitor and/or to control operations of one or more respective MSDs 240, 250, 260, 270 on a heavy duty vehicle 100. It is appreciated that an MSDA provides a control and/or a monitoring interface between a VUC 210, 210' external to the WEC, and a respective MSDs operational functionality. The WEC 220 is arranged to identify a matching MSDA for each MSD in a set of MSDs, such that each MSD connected to the WEC is matched to a respective MSDA. The WEC 220 is also arranged to receive a monitor and/or a control command from the VUC 210, 210' for monitoring and/or controlling an MSD connected to the WEC, and to control the MSD via the respective matching MSDA.

This means that the number of supported MSDs by the WEC depends on the availability of MSDAs in the WEC. So that, if an MSD supplier wants to provide a compatible MSD, the supplier may simply develop an MSDA for that MSD and supply the MSDA together with the MSD. A vehicle manufacturer becomes more free to select between MSDs from different suppliers, since the MSDAs provide transparency with respect to the VUC. Also, the WEC can be used to control a plurality of different MSDs, potentially from different suppliers and of different type, since the WEC can be tailored for different MSDs by respective installing MSD-specific MSDAs.

Suppose for instance that two or more different types of friction brakes are available on the market, and that the physical control interface between friction brake and WEC is the same for all brakes. Suppose further that a workshop runs out of friction brakes of a first type, but still has a stock of a second type. Then, if a heavy duty vehicle for some reason needs to replace one or more friction brakes, the friction brake from the supplier of the second type of friction brake can be used even if the other friction brakes on the vehicle is of the first type. The properties and response characteristics of the two types of friction brakes most likely differ, e.g., one type may yield a stronger braking effect for a given control signal level compared to the other type. However, the vehicle control algorithms, i.e., VMM and TSM, need not be adjusted to account for this difference, as long as a matching MSDA can be found to interface with the type of friction brake that is connected to each WEC.

The MSDA-based control architecture can also be used with advantage to make sure that the MSDs currently mounted on a vehicle meets specifications and requirements imposed on a given vehicle. Suppose for instance that the second type of friction brake discussed above has not been certified for use with a particular type of vehicle. Then, if an authentication procedure is required when installing a new type of MSDA, the MSDA matching that uncertified friction brake will not pass and the switch to a new type of friction brake will not be permitted.

According to some aspects, MSDs can be categorized into two basic types. A first type of MSD are those MSDs which are robust in the sense that they are mature, stable, simple, and/or have been extensive verified by the vehicle manufacturer. For such MSDs input/output (I/O) from the MSD to the WEC can be designed such that MSD complexity is transferred to the WEC to a large extent, possibly avoiding the need for a microcontroller on the MSD altogether. Most if not all software defined functionality will be executed on the WEC for such first type MSDs.

A second type of MSD is somewhat of the opposite to the first type of MSD, i.e., those MSDs which are, e.g., immature, unstable, and/or very complex. For these MSDs it may be preferred to have defined communication interfaces with respect to the WEC, and let the MSD supplier handle the MSD development instead of bringing the MSD control and monitoring functionality into the WEC. A type two MSD may of course eventually evolve into a type one MSD over time.

Of course, more than two types can be defined in-between the two extremes of the first and the second type, where functionality is distributed between the WEC and the MSD microcontroller.

Advantageously, if an MSD such as an electric machine breaks, it can be replaced by another MSD, perhaps of a different type or brand. As long as the appropriate MSDA for the new MSD is available, and the MSDA provides the same interface as the previous one (as well as that MSD is compatible on analogue and digital I/Os as well), the replacement will be straight forward.

It is appreciated that an MSDA will normally be developed for a particular form of physical interface towards the respective MSD. In case the MSDA uses a general I/O on the WEC for interfacing with the MSD, a mapping or association between analogue and digital ports of the WEC and MSDA signal interface can be configured.

Optionally, the WEC 220 is also arranged to store one or more default MSDAs, and to associate a default MSDA with an MSD in case no matching MSDA can be identified in the plurality of replaceable MSDA. The default MSDA may provide a basic functionality for using a given MSD, which may not comprise the full feature set of the MSD but will allow basic operations. For instance, an unsupported wheel brake may be operated by the default driver to generate rudimentary braking operations, but not more advanced wheel slip control functionality. Here the MSD and MSDA also need to be electrically connected to the same I/O ports to get this to work and the MSDs thus needs to have the same (not just similar) electric characteristics.

An advantage of this control architecture based on MSDA is that the WEC 220 may be configured to receive one or more updated MSDAs in field, and to replace corresponding stored MSDAs by the received updated MSDAs. This way the control architecture can be kept up to date and bug-fixes and the like can be applied in field, i.e., without visiting a service center physically for a software upgrade. The one or more updated MSDAs may, e.g., be received by the WEC 220 via the VUC and the wireless link to the remote server discussed above in connection to FIG. 1.

The WEC may be configured to regularly search for available updates to its installed MSDAs on one or more trusted MSDA repositories, similar to the normal operation of a personal computer. These updates may, e.g., be maintained at the VUC 210 or at the remote server 190 which may implement a trusted MSDA repository where different suppliers (developers) of both MSDs and MSDAs can upload new verified MSDAs and also verified updates to existing MSDAs. Thus, according to some aspects, the WEC 220 is configured to connect to an external MSDA repository, to identify one or more updated MSDA, download the identified updated MSDA, and replace corresponding stored MSDA by the downloaded updated MSDA. In order to identify updated MSDAs, version numbers and/or timestamps may be associated with the MSDAs. Drivers may also be digitally signed by a trusted authority following verification by the trusted authority. This way the VUC and/or the WEC can make sure that the downloaded MSDAs can be trusted, i.e., that they have undergone the necessary testing and verification before being made available in the repository.

The WEC 220 may also be arranged to execute an authentication protocol for verifying that the MSDAs currently active in the WEC are authorized for use with the WEC. This authentication protocol may, for instance be based on a challenge response procedure where the WEC challenges the MSDA and verifies that the response by the MSDA is the correct one.

The simplest example of a challenge-response protocol is normal password authentication, where the challenge is asking for the password and the valid response is the correct password. Other known challenge-response protocols based, e.g., on public key cryptography and the like can of course also be used to authorize use of a given MSDA. The WEC, the VUC, or even the remote server 190 may maintain an up-to-date list of approved MSDs.

When the WEC 220 connects to an MSD 240, 250, 260, 270 or to a sensor device 290, comprising an on-board microcontroller or processing device it may also issue a challenge, and if the correct response is not obtained from the on-board microcontroller of the MSD or from the sensor processing circuit, the WEC may trigger a warning signal, or even prevent vehicle operation until the challenge is correctly responded to.

A vehicle operational domain is a set of driving scenarios and use-cases in general for which the vehicle was designed. Operation outside of the vehicle operational domain means that the vehicle is used for something for which it was not intended. What constitutes an approved MSDA which may be used by a given WEC may be configured in dependence of an operational domain of the vehicle 100 where the WEC is mounted. Some vehicles may be associated with more strict requirements on the MSDs than other vehicles. For instance, a heavy duty vehicle transporting dangerous goods may place stricter requirements on mounted MSDs compared to a heavy duty vehicle transporting less dangerous goods. The requirements may also be configured in dependence of the current transport mission being executed by the vehicle. According to some aspects, when a new MSD is connected to a WEC, the WEC accesses a database of approved MSDAs, perhaps located on the remote server 190, for use with the current vehicle and operational design domain. If the MSDA and MSD is not found in that list, the WEC may trigger a warning signal or even prevent vehicle operation. For instance, if a new friction brake is attached to the vehicle which does not fulfil requirements placed on the vehicle, then a warning signal can be issued by the WEC. This warning signal may cause the VUC to limit the operational design domain of the vehicle, e.g., limit maximum velocity or place more strict constraints on the VMM force allocation routines.

The WEC 220 is optionally arranged to manage one or more wheel end sensors 290, possibly arranged in combination with an MSD. The WEC 220 may then be arranged to obtain and to store one or more data processing algorithms associated with respective wheel end module sensors. According to some aspects of the present disclosure, sensors are seen as attributes of a device. For instance, a wheel may be associated with an MSDA, and this MSDA may encapsulate attributes such as current wheel pressure and current wheel speed.

These data processing algorithms comprised in an MSDA describe how to process data from a given sensor in order to obtain a certain result, and potentially also how to format this result prior to reporting. The data processing algorithms may then be configured differently depending on the type of sensor in order to account for variation between different types of sensors from different suppliers. The WEC may then obtain sensor data from a wheel end module sensor, execute a data processing algorithm associated particularly with the wheel end module sensor, and thus process the sensor data into a result and format which can be reported to the VUC on the standardized interface 215. This brings the additional benefit that sensors can be selected freely for mounting onto a vehicle and the adaptations required to account for a new type of sensor will be largely contained to the WEC software on the same computing platform which supported the old type of sensor. As long as the relevant data processing algorithms are available for loading into the WEC, the choice of sensor becomes transparent to the VUC who will receive the requested information in the desired format, potentially over a standardized interface, regardless of the format of the actual sensor data reported from the sensor. The data processing algorithms may for instance comprise algorithms and/or parameters for estimating any of; wheel rotation angle, wheel speed, wheel force and/or wheel torque based on sensor data. The data processing algorithms are optionally also configurable in dependence of a tyre associated with the wheel end module. Different tyres may have different properties which can be accounted for by the WEC. The tyre supplier can then provide the relevant software routines together with the actual tyre and thereby customize the data processing and the parameter estimation performed by the WEC to be optimized for a particular type of tyre.

Figure 4:
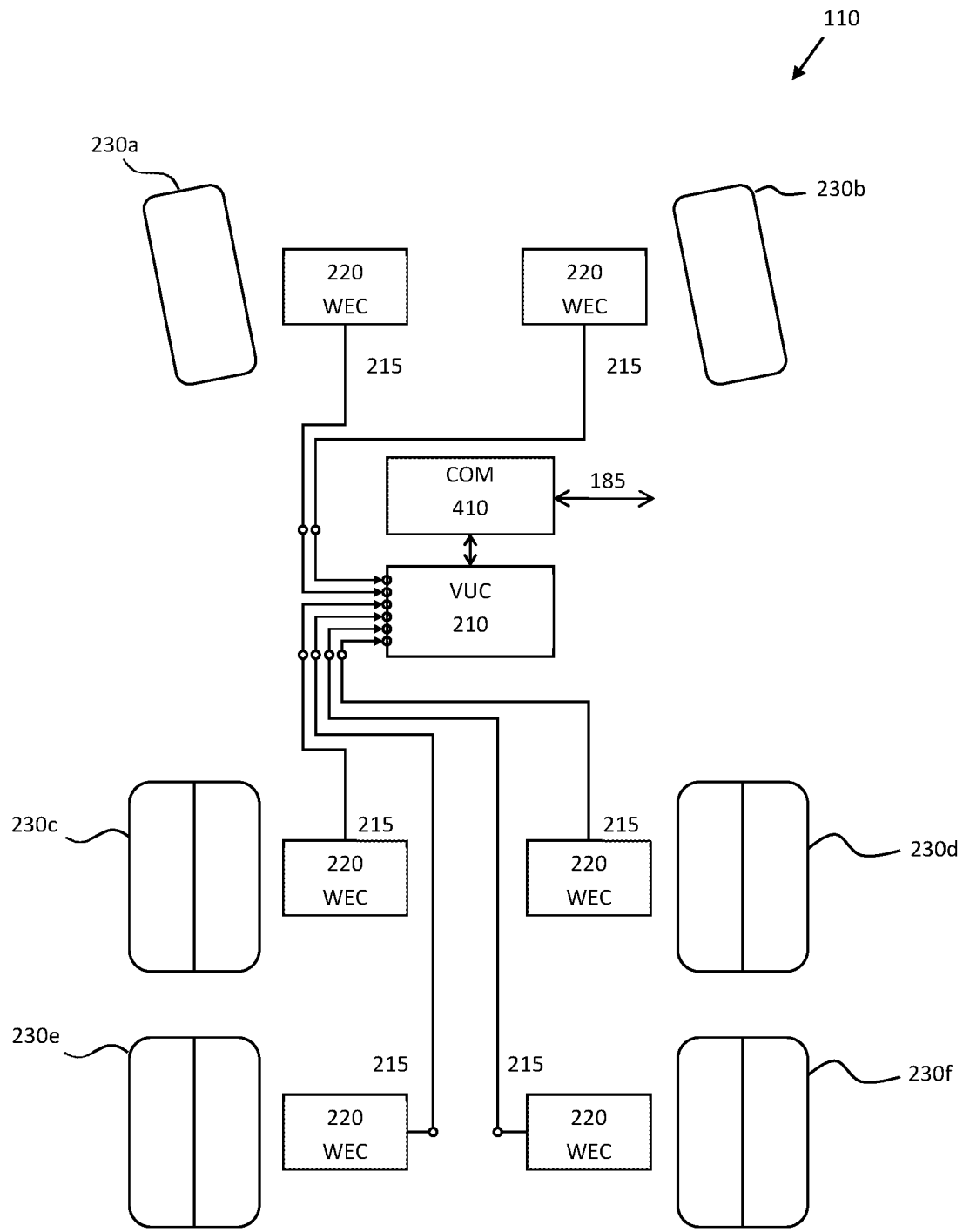
FIGS. 4-5 show control systems for a vehicle unit.

FIG. 4 illustrates a VUC 210 comprising an interface for connecting to a plurality of WECs according to the discussion above. Each wheel is controlled by a respective WEC 220. Alternatively, one WEC may be arranged per wheel axle, or group of wheel axles. Different types of MSDs from different suppliers may be mounted at the different wheels 230*a*, 230*b*, 230*c*, 230*d*, 230*e*, 230*f*, and these MSDs are then controlled by the VUC via the respective WECs which implement matching MSDAs for the MSDs connected to the WEC 220. As mentioned above, some WECs may use default MSDAs for controlling one or more connected MSDs due to that the correct MSDA was not available, although this situation may be rare. The communication between the functionality of VMM running on the VUC and the control routines running on the different WECs may be formatted according to standardized interface formats.

The VUC 210 is connected to a communications module 410 for linking to a remote network, such as a radio base station in a cellular communications network illustrates in FIG. 1. Such networks may comprise fourth generation 4G cellular networks and fifth generation cellular networks, defined by the third generation partnership program (3GPP).

Figure 5:
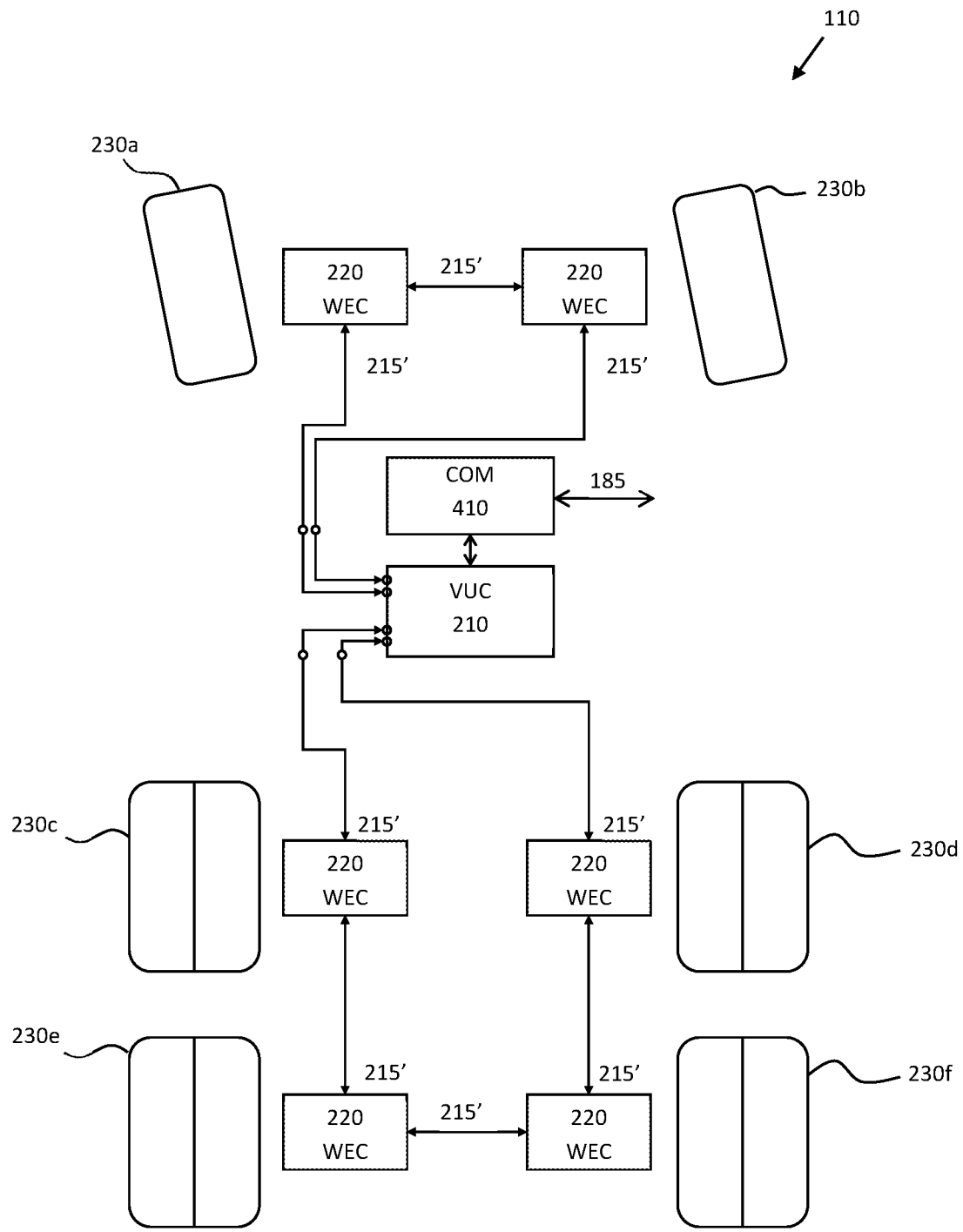

FIG. 5 illustrates an alternative layout for communication between VUC 210 and WECs on the vehicle unit 110. Here, instead of a point-to-point connection between the VUC and the different WECs as in FIG. 4, two daisy chained links 215' connect the VUC to the WECs. This way a measure of redundancy is provided, since one of the daisy chained links may break without interrupting communication between VUC 210 and WECs 220.

Figure 6:
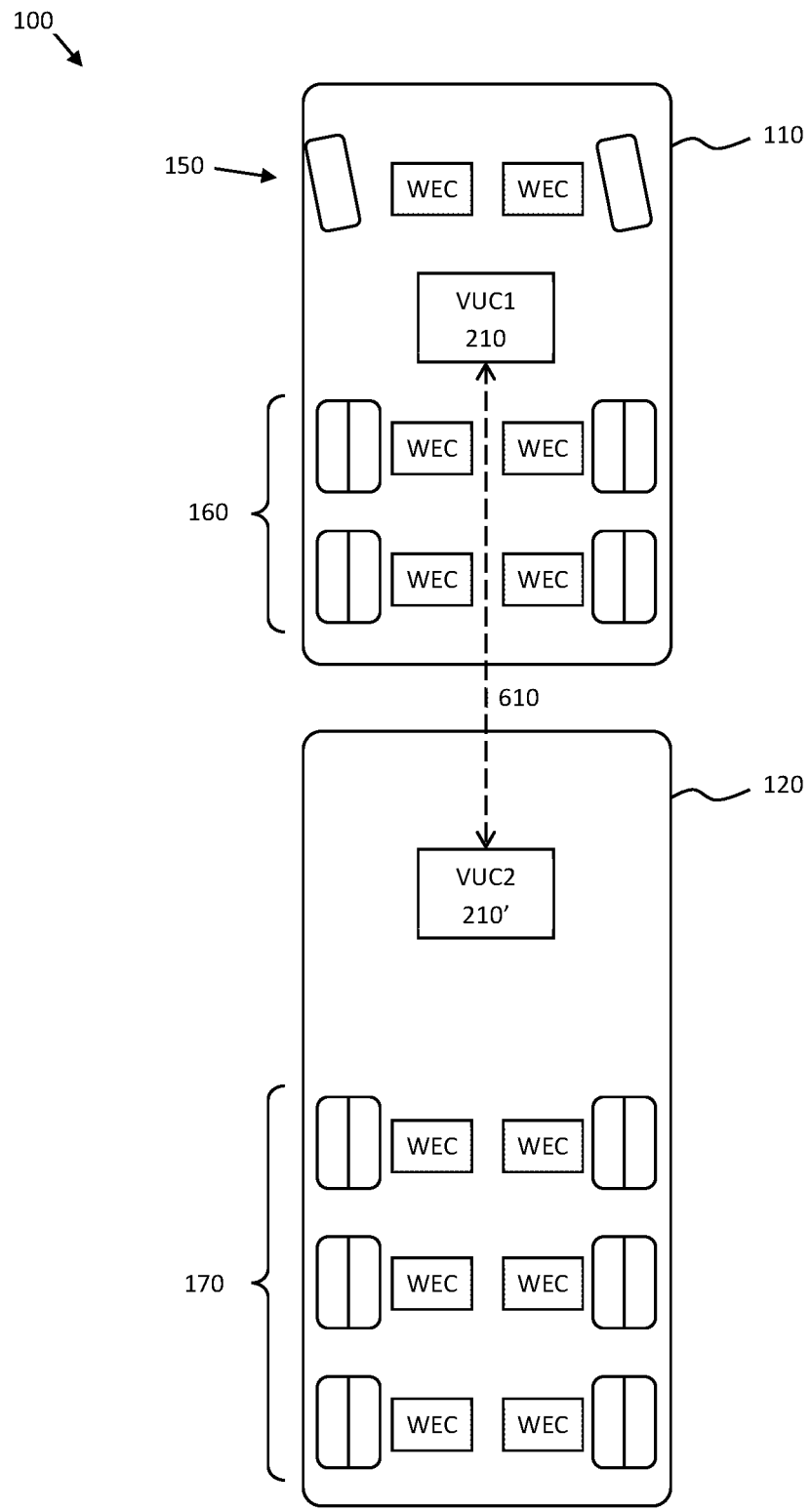
FIG. 6 shows a control system for a vehicle unit combination.

FIG. 6 schematically illustrates a vehicle 100 comprising two vehicle units 110, 120. The trailer unit 120 here also comprises a VUC 210'. This VUC 210' operates in slave mode and is controlled by the VUC 210 in the tractor which is operating in master mode. The communication link 610 between the two VUCs may be a wireline communication link, such as an Ethernet link. The communication link may also be a wireless link, or a combination of a wireless link and a wireline link.

Figure 7:
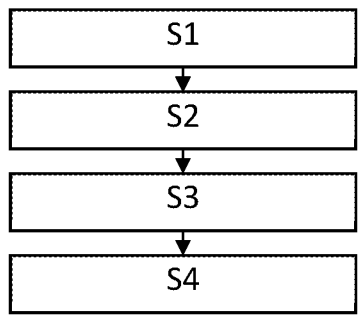
FIG. 7 is a flow chart illustrating a method.

FIG. 7 is a flow chart illustrating methods which summarize at least some of the discussions above. There is illustrated a method for controlling one or more MSDs 240, 250, 260, 270 by a WEC 220. The method comprises obtaining and storing S1 a plurality of replaceable MSDAs, where an MSDA provides an interface to control and/or to manage one or more functions of an MSD connected to the WEC from an external vehicle unit computer 210, 210'. The method also comprises identifying S2 a matching MSDA for each MSD in a set of MSDs currently connected to the WEC, such that each connected MSD is associated with a respective matching MSDA, and receiving S3 a control command from the VUC 210, 210' for controlling an MSD connected to the WEC, as well as controlling S4 the MSD via its respective MSDA.

Figure 8:
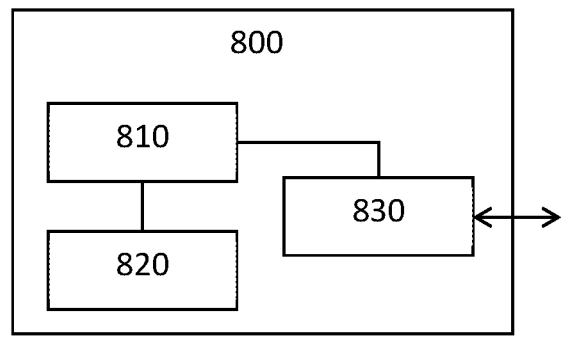
FIG. 8 schematically illustrates a control unit.

FIG. 8 schematically illustrates, in terms of a number of functional units, the components of a control unit 800 such as the WEC 220 or the VUC 210, 210' according to embodiments of the discussions herein. This control unit 800 is configured to execute at least some of the functions discussed above for control of a heavy duty vehicle 100. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 820. The processing circuitry 810 may further be provided as at least one application specific integrated circuit ASIC, or field programmable gate array FPGA.

Particularly, the processing circuitry 810 is configured to cause the control unit 101 to perform a set of operations, or steps, such as the methods discussed in connection to FIG. 7. For example, the storage medium 820 may store the set of operations, and the processing circuitry 810 may be configured to retrieve the set of operations from the storage medium 820 to cause the control unit 800 to perform the set of operations. The set of operations may be provided as a set of executable instructions. Thus, the processing circuitry 810 is thereby arranged to execute methods as herein disclosed.

The storage medium 820 may also comprise persistent storage, which, for example, can be any single one or combination of magnetic memory, optical memory, solid state memory or even remotely mounted memory.

The control unit 800 may further comprise an interface 830 for communications with at least one external device. As such the interface 830 may comprise one or more transmitters and receivers, comprising analogue and digital components and a suitable number of ports for wireline or wireless communication.

The processing circuitry 810 controls the general operation of the control unit 800, e.g., by sending data and control signals to the interface 830 and the storage medium 820, by receiving data and reports from the interface 830, and by retrieving data and instructions from the storage medium 820. Other components, as well as the related functionality, of the control node are omitted in order not to obscure the concepts presented herein.

Figure 9:
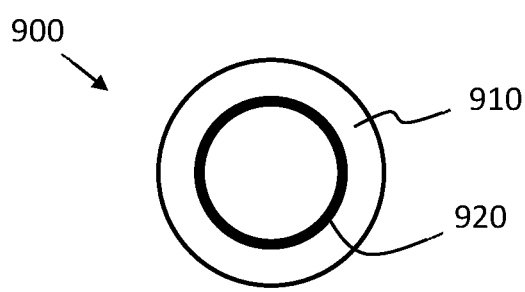
FIG. 9 shows an example computer program product.

FIG. 9 illustrates a computer readable medium 910 carrying a computer program comprising program code means 920 for performing the methods illustrated in FIG. 7, when said program product is run on a computer. The computer readable medium and the code means may together form a computer program product 900.

It is appreciated that the MSDAs discussed herein may form part of a compiled binary which is then loaded onto the WEC. Thus, it is appreciated that for some implementations, replacing an MSDA may entail recompiling a binary comprising a plurality of MSDAs, and replacing the binary on the WEC with the newly compiled binary. The installation entities of an MSD may of course also comprise several files, as opposed to a single binary.

The invention claimed is:

1. A wheel end computer "WEC" configured to host and to execute one or more motion support device abstractions "MSDAs" for monitoring and/or controlling operations of one or more respective motion support devices "MSDs" on a heavy duty vehicle,
where an MSDA provides a control and/or a monitoring interface between an external vehicle unit computer "VUC" and a respective MSDs operational functionality, wherein the WEC is arranged to identify a matching MSDA for each MSD in a set of MSDs connected to the WEC, such that each MSD connected to the WEC is matched to a respective MSDA, and wherein the WEC is arranged to receive a monitoring and/or a control command from the VUC for monitoring and/or controlling an MSD connected to the WEC, respectively, and to control the MSD via the respective matching MSDA.

2. The WEC according to claim 1, wherein the WEC is arranged to obtain and to store a plurality of replaceable MSDAs.

3. The WEC according to claim 1, comprising an output port for controlling one or more connected devices comprising any of; a wheel brake, an active suspension device, a propulsion device, and/or a power steering device, based on the plurality of replaceable MSDA.

4. The WEC according to claim 1, comprising an input port for receiving data from one or more connected devices comprising any of; a wheel brake, an active suspension device, a propulsion device, and/or a power steering device, wherein data from a connected device is arranged to be interpreted by the matching MSDA in the plurality of replaceable MSDA.

5. The WEC according to claim 1, arranged to store one or more default MSDAs, and to associate a default MSDAs with an MSD in case no matching MSDA can be identified in the plurality of replaceable MSDA.

6. The WEC according to claim 1, configured to receive one or more updated MSDAs, and to replace corresponding stored MSDAs by the received updated MSDAs.

7. The WEC according to claim 1, configured to connect to an external MSDA-repository, to identify one or more updated MSDAs, download the identified updated MSDAs, and to replace corresponding stored MSDAs by the downloaded updated MSDAs.

8. The WEC according to claim 1, arranged to execute an authentication protocol for verifying that the set of MSDAs currently active in the WEC are authorized for use with the WEC.

9. The WEC according to claim 1, arranged to execute an authentication protocol for verifying that an MSD currently connected to the WEC is authorized for use with the WEC, wherein the MSD currently connected to the WEC comprises a control unit configured to communicate with the WEC via the respective matching MSDA.

10. The WEC according to claim 8, wherein the authentication protocol comprises a challenge response procedure.

11. The WEC according to claim 1, arranged to obtain and to store one or more data processing algorithms associated with respective wheel end and/or axle sensors, wherein the WEC is arranged to obtain sensor data from a wheel end and/or axle sensor, and to execute a data processing algorithm associated with the wheel end and/or axle sensor to process the sensor data.

12. The WEC according to claim 11, wherein the data processing algorithms comprise algorithms for estimating any of; wheel rotation angle, wheel speed, wheel force and/or wheel torque, tyre wear, brake pad wear, and capability changes due to temperatures based on sensor data.

13. The WEC according to claim 11, wherein the data processing algorithms are configurable in dependence of a tire associated with the wheel end module.

14. A system comprising the VUC and a plurality of, WECs according to claim 1, wherein the VUC comprises an interface for connecting to the plurality of WECs.

15. A vehicle unit for an articulated heavy duty vehicle comprising a system according to claim 14.

16. A method for controlling one or more motion support devices "MSDC" by a wheel end computer "WEC" the method comprising obtaining and storing a plurality of replaceable motion support device abstractions "MSDAs" where an MSDA provides an interface to control and/or to monitor one or more functions of an MSD connected to the WEC from an external vehicle unit computer "VUC" identifying a matching MSDA for each MSD in a set of MSDs currently connected to the WEC, such that each connected MSD is associated with a respective matching MSDA, receiving a control command and/or a monitoring command from the VUC for controlling and/or for monitoring an MSD connected to the WEC, and controlling and/or monitoring the MSD via its respective MSDA.

17. A non-transitory computer-readable storage medium comprising instructions which, when executed by a computer, cause the computer to carry out the steps of the method according to claim 16.

* * * * *